United States Patent [19]

Guido et al.

[11] Patent Number: 4,881,763
[45] Date of Patent: Nov. 21, 1989

[54] FUEL INJECTION LINE WITH COMPRESSION NIPPLE FORMED THEREON BY UPSETTING AND PROCESS FOR THE PRODUCTION THEREOF

[75] Inventors: Jürgen Guido, Berliner Strasse 6, D-8402 Neutraubling; Norbert Binzer, Neutraubling, both of Fed. Rep. of Germany

[73] Assignee: Jürgen Guido, Neutraubling, Fed. Rep. of Germany

[21] Appl. No.: 264,931

[22] Filed: Oct. 31, 1988

[30] Foreign Application Priority Data

Jan. 21, 1988 [DE] Fed. Rep. of Germany ....... 3801703

[51] Int. Cl.$^4$ ................ C21D 1/00; F02M 55/02; F16L 19/00; F16L 35/00
[52] U.S. Cl. .................................. 285/382; 123/469; 148/12 R; 148/148; 148/DIG. 3; 285/386; 285/116
[58] Field of Search .............. 285/354, 332, 384, 386, 285/422, 332.1, 331, 917; 148/146, 147, 148, 153, 12 R, 12 B, DIG. 3; 123/468, 469, 471; 277/99, 100, 236, 235 R, 235 A

[56] References Cited

U.S. PATENT DOCUMENTS

| 33,315 | 9/1861 | Wilson | 148/12 R |
|---|---|---|---|
| 663,155 | 12/1900 | Budke | 148/12 R |
| 827,882 | 8/1906 | Pierce | 148/12 R |
| 4,665,876 | 5/1987 | Hashimoto | 123/469 X |
| 4,679,828 | 7/1987 | Bernardot | 285/382.2 X |
| 4,705,306 | 11/1987 | Guido et al. | 285/332 |

FOREIGN PATENT DOCUMENTS

| 2334445 | 7/1973 | Fed. Rep. of Germany | 123/469 |
|---|---|---|---|
| 0888055 | 1/1962 | United Kingdom | 285/354 |

Primary Examiner—Randolph A. Reese
Assistant Examiner—P. Frechette
Attorney, Agent, or Firm—Sughrue, Mion, Zinn Macpeak & Seas

[57] ABSTRACT

A fuel injection line for an internal combustion engine is provided at least one of its ends with a compression nipple formed thereon by upsetting, with a sealing taper portion having a sealing surface at a taper angle relative to the axis of the nipple. The taper portion, with plastic deformation of its sealing surface, serves for sealing against a hollow taper surface, with a corresponding taper angle, of a co-operating portion which is harder than the sealing surface of the nipple. Its rearward bearing surface which is intended for bearing against a hollow taper surface of a cap nut for fixing the nipple is in the form of a spherical segment which blends into the outside peripheral surface of the adjoining pipeline by way of a rounded portion. The injection line is formed from a pipe of steel of cold-worked hardness, the nipple being formed on the pipe and then subjected to inductive soft annealing in its zone in the region at which the surface of its sealing taper portion is in contact against the hollow taper surface of the co-operating portion.

10 Claims, 1 Drawing Sheet

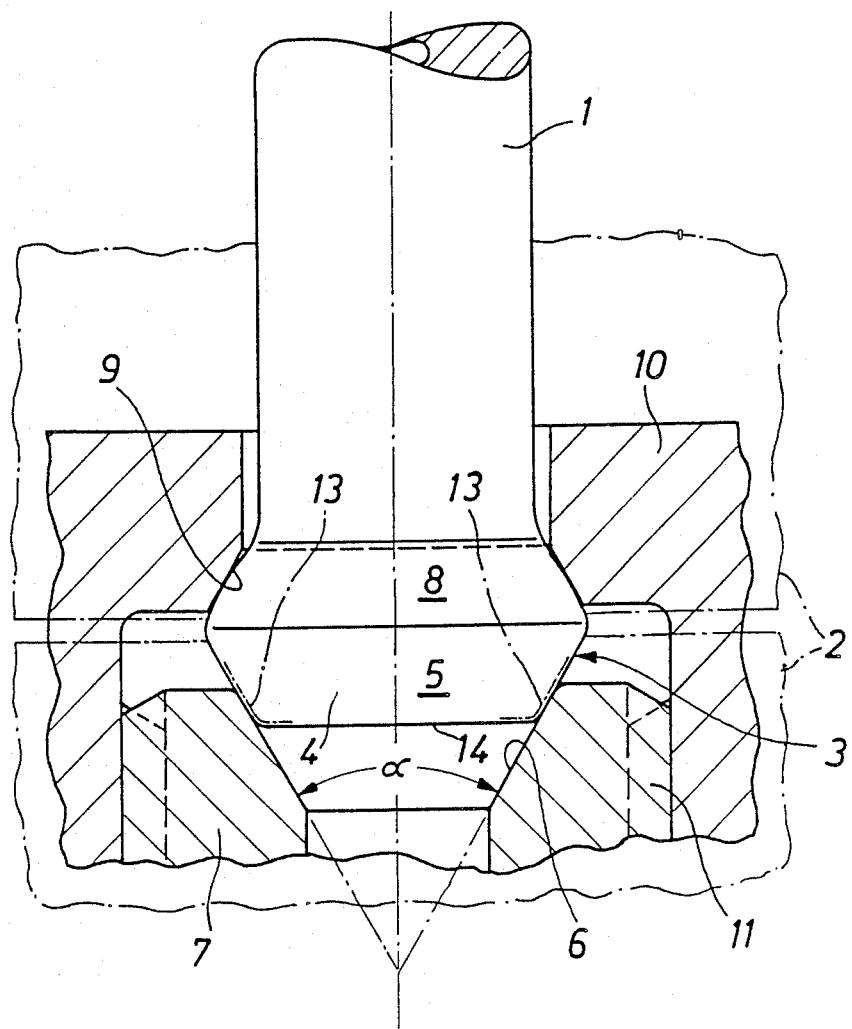

FUEL INJECTION LINE WITH COMPRESSION NIPPLE FORMED THEREON BY UPSETTING AND PROCESS FOR THE PRODUCTION THEREOF

BACKGROUND OF THE INVENTION

This invention relates to a fuel injection line for an internal combustion engine and a process for the production thereof.

Injection lines for internal combustion engines, as are described for example in German patent specifications Nos 1 937 975 and 2 138 043, involve using pipes in accordance with the Federal Republic of Germany standard DIN 73000 of low-carbon non-alloyed steel, for example St 30 Al. Those pipes are subjected to a normalising annealing operation prior to a compression nipple being formed thereon by upsetting so that the cold deformation effect which occurs when the compression nipple is formed on the pipe by upsetting can be produced without the formation of cracks and with only a moderate level of stresses being produced. The pipe which is subjected to the annealing operation prior to the compression nipple being formed thereon by upsetting has a number of advantages as an injection line: the alternating bending strength in the region which adjoins the compression nipple and which is particularly subjected to vibrational loadings and is particularly in danger of rupture is only slightly adversely affected. In addition, subsequent bending of the injection line when fitting it to an internal combustion engine requires only low forces and can therefore be carried out using simple tools. Finally, only a slight spring-back effect occurs when bending the injection line so that good bending accuracy is achieved, while it is also guaranteed that the material which is to be found at the sealing surface of the compression nipple undergoes plastic deformation so as to provide a good sealing effect when the sealing surface of the nipple is pressed against the hollow taper surface of a portion with which the compression nipple co-operates and which is harder than the nipple.

However a disadvantage with such injection lines which are produced in the above-discussed manner is that the preliminary annealing operation in respect of the pipes used considerably increases the manufacturing costs and gives rise to the danger of the injection line being contaminated by annealing residues. In addition, the fact that the preliminary annealing operation is effected throughout the compression nipple arrangement means that the material at the rearward spherical zone of the compression nipple which is formed on the pipe by upsetting is also corresponding soft so that that bearing surface of the compression nipple rapidly wears when the cap nut for fixing the nipple in position is repeatedly loosened and tightened again.

SUMMARY OF THE INVENTION

An object of the invention is to provide an injection line for an internal combustion engine which is considerably less expensive in manufacture thereof than previous injection lines, while retaining the essential advantages thereof.

Another object of the invention is an injection line for an internal combustion engine which while being simple to produce is better suited to the conditions of use of such a line.

Still another object of the invention is to provide an injection line for an internal combustion engine which is adapted in a more rational fashion to the various requirements imposed thereon.

Yet another object of the invention is to provide a process for the production of an injection line for an internal combustion engine which constitutes a simple but rational procedure.

In accordance with the present invention these and other objects are achieved by a fuel injection line for an internal combustion engine which at least one of its ends has a compression nipple formed thereon by upsetting, with a sealing taper portion providing a sealing surface at a taper angle to the axis of the nipple. The taper portion, with plastic deformation of its sealing surface, serves for sealing against a hollow taper surface with a corresponding taper angle of a co-operating portion which is harder than the sealing surface of the nipple. The nipple further comprises a rearward bearing surface intended to bear against a hollow taper surface of a cap nut for fixing the nipple. The rearward bearing surface is in the form of a spherical segment which blends into the outside peripheral surface of the adjoining portion of the pipe by way of a rounded transitional portion. The injection line is formed from a pipe of steel of cold-worked hardness, the compression nipple being formed by upsetting on the pipe. The compression nipple is then subjected to inductive soft annealing in its zone in the region at which the surface of its sealing taper portion is in contact with the hollow taper surface of the co-operating portion.

In this specification the expression cold-worked hardness is used to indicate that the pipe which is produced for example by drawing is thus of a metal in a hardened condition and that the pipe produced in that way is left in the hard condition after the cold-working operation of drawing the pipe and is not subjected to a heat treatment for softening same. Such a cold-worked hardness condition is as set forth in DIN 2391 relating to seamless precision steel pipes, to which reference is accordingly particularly directed and which will be further mentioned below.

The configuration of the injection line with nipple in accordance with the invention is based on the realization that the form of compression nipple to which the present invention generally relates, known also by the term 'ball nipple' as described in German patent specifications Nos 1 937 975 and 2 138 043, with their rounded transitions, are so suitable for cold deformation that they can also be formed by upsetting in a cold condition on a starting material of steel which is of cold-worked hardness, without a preliminary soft annealing operation but nonetheless without cracks being formed. That can give a reduction in costs of manufacture of up to 20%.

On the other hand other forms of nipple, for example in accordance with DIN 73365, may only be formed by upsetting on pipes of cold-worked hardness, with substantial formation of cracks, which can be of a major problem.

Thus in this context, as indicated above, a steel pipe of cold-worked hardness means for example a steel pipe in accordance with DIN 2391 of the material St 30 Al, with the following properties:

(a) Hardness 195 to 205 HV 5 (Vickers hardness)
(b) Elongation to fraction 16%

| | |
|---|---|
| (c) Tensile strength | 525 to 610 N/mm² (N = Newton) |
| (d) Yield point or 0.2 limit | 470 N/mm² |
| (e) Structure | cold-worked ferrite structure with a small proportion of perlite |

By virtue of the advantageous form of the nipple in accordance with the invention, only a small amount of stress is built up when it is formed by upsetting on a pipe of steel of cold-worked hardness so that the good material properties of the pipe are retained and, in comparison with hitherto conventional injection lines of soft-annealed steel pipes, result in a significant improvement in the alternating bending strength in the critical region behind the compression nipple. In that connection measurements made showed in practice an improvement in alternating bending strength of 15% and more.

When bending injection lines made of steel of cold-worked hardness, substantial resilient return forces do not in fact occur, but because of the very uniform quality of steel pipes of cold-worked hardness, the greater resiliency or spring-back effect is also highly uniform so that it can be accurately taken into consideration, when using bending tools for fitting the line, in such a way that such spring-back effect does not involve any serious disadvantage. In addition the mechanical bending processes available readily permit the bending forces which occur, as has been proven in practice.

As a further advantage of the injection line according to the invention, because the rearward bearing surface of the nipple, which is in the form of a spherical segment and which serves for bearing against the hollow taper surface of the associated cap nut, is harder than in the case of prior injection lines comprising pipe which has been previously subjected to annealing throughout, the wear which occurs when the cap nut is tightened relative to the bearing surface is considerably reduced and therefore the injection line according to the invention can be released and re-tightened substantially more often.

In a preferred embodiment of the injection line according to the invention the annealing operation (re-crystallisation annealing) in respect of the specified zone is effected at a temperature of about 700° C. to a depth of about 0.4 to 0.6 mm, preferably 0.5 mm. In that recrystallisation-annealed soft material zone in the sealing taper portion of the ball nipple, the same properties are produced as are to be found in the sealing taper portions of ball nipples on prior injection lines which were previously subjected to annealing throughout; in accordance with the invention, the values produced are for example as follows:

| | |
|---|---|
| (a) Hardness | 115 to 125 HV 5 |
| (b) Elongation to rupture | 38% |
| (c) Tensile strength | 380 N/mm² |
| (d) Yield point or 0.2 limit | 220 N/mm² |
| (e) Structure | Fine-grain recrystallisation structure |

When a pipe of high-carbon steel which is non-alloyed or, if it is still at all suitable for the drawing of pipes, can even be alloyed, is used for the injection line according to the invention, then, in spite of easy sealing of the compression nipple relative to the co-operating portion being retained, the arrangement provides very good alternating bending strength in respect of the injection line, in particular at the part of the line adjoining the compression nipple, as well as a correspondingly reduced expenditure in the damping of vibration on fitted injection lines, and finally also considerably increased reusability after the removal of such injection lines.

If a pipe of low-carbon non-alloyed steel is used, then there is a cost advantage of about 20% in comparison with the hitherto conventional manufacturing process.

Other objects, features and advantages of the invention will be more clearly apparent from the following description of an embodiment thereof.

BRIEF DESCRIPTION OF THE DRAWING

The single FIGURE of the accompanying drawing shows an injection line with a ball nipple formed thereon, with a view in section of the cooperating portion which fits thereto, with cap nut, the dash-dotted lines representing an extrusion tool for forming the compression nipple by upsetting.

DESCRIPTION OF THE PREFERRED EMBODIMENT

Referring now to the drawing, illustrated therein is an end portion of an injection line for an internal combustion engine, the line being made from a starting material consisting of steel of cold-worked hardness, as defined above. At one of its ends (or, in a manner which is not shown in the drawing, at both ends), the injection line 1 carries a respective compression nipple 3 which is formed by upsetting thereon in a closed extrusion tool 2 which is shown in dash-dotted lines in the drawing. The compression nipple 3 has a sealing taper portion 4 which is formed in the upsetting operation and which by way of its sealing surface 5 serves for sealing against a hollow taper surface 6 of a co-operating portion 7. The surface 6 matches the sealing surface 5, with a taper angle α of about 60°. The co-operating portion 7 may be for example a component of an injection pump for feeding fuel (not shown) through the injection line 1 to an injection nozzle (also not shown).

The compression nipple 3 has a rearward bearing surface comprising a spherical zone or a spherical segment 8 and serving for bearing against a hollow taper surface 9 of a cap nut 10. For sealingly pressing the compression nipple 3 against the co-operating portion 7, the cap nut 10 is screwed on to a male screwthread 11 on the co-operating portion 7 in the usual manner.

The compression nipple 3 as illustrated and described above is also referred to as a 'ball nipple' because it recalls a ball shape, in particular by virtue of its spherical segment 8 which, when the cap nut 10 is tightened, ensures self-centering of the compression nipple 3.

The extrusion tool 2 which is only schematically indicated in the drawing is readily capable of forming the illustrated compression 3 - or also other similarly shaped 'ball nipples' - by upsetting on injection lines 1 of any steel which is of cold-worked hardness, therefore also including high-carbon or even alloyed steel, as long as the material used still has the necessary cold working reserve and in any case is suitable for drawing of the pipes required for injection lines. However, in order to make full use of the above-mentioned advantages of injection line pipes, which are harder than the prior pipes, made of steel of coldworked hardness, on which the compression nipples 3 are formed by upsetting without a soft annealing operation beforehand, the following points should be taken into consideration:

In the case of injection lines of hitherto conventional nature, being subjected to an annealing operation in a particular working procedure prior to the compression nipples being formed thereon, in accordance with DIN 73000, of a low-carbon steel, the resulting compression nipple is softer than the hardness of the co-operating portion 7. Therefore, when the cap nut 10 is tightened on the screwthread 11 to press the surface 5 against the hollow taper surface 6, the sealing surface 5 of the compression nipple undergoes plastic deformation so as to ensure a reliable sealing effect. Such a sealing effect is extremely important under the rough conditions of operation involved, in particular having regard to the vibrational loadings, on internal combustion engines. Therefore in the case of prior compression nozzles, it has been tolerated that the material of the nipple which forms the spherical zone or the spherical segment and which is equally soft, is subjected to wear at a comparatively fast rate when the cap nut 10 is tightened, so that after just a few assembly operations, an injection line of that kind becomes useless.

In the case of the compression nipple 3 illustrated in the drawing and formed from a steel of cold-worked hardness without a preliminary soft annealing operation, there is accordingly the advantage of a correspondingly harder spherical zone 8 and therefore a substantially higher level of resistance to wear when the cap nut 10 is released and re-tightened. It should be noted however that directly after the operation of shaping the compression nipple 3, the sealing surface 5 thereof is also equally hard so that no plastic deformation could be produced when tightening the cap nut 10 against the sealing surface 5 of the compression nipple 3. In order to remedy that, the compression nipple 3 which is formed on the injection line 1 by upsetting is subjected to inductive soft annealing (recrystallisation annealing) in its material zone 13 which is shown by dash-dotted lines in the drawing and which is to be found in the region of the contact surface of its sealing taper portion 4 against the hollow taper surface 6 of the co-operating portion 7, more particularly preferably in such a way that the above-mentioned material parameters occur in the zone 13. In that arrangement the annealed material zone 13 preferably extends in the manner shown in the drawing beyond the contact surface of the sealing taper portion 4 against the co-operating portion 7, more particularly on the one hand towards the base region of the sealing taper portion 4 where it is of large diameter and on the other hand also into the end face 14 at the free end thereof.

In that procedure the inductive annealing operation is effected by means of a conventional induction coil which is fed with alternating current and which is arranged in conventional suitable manner around the compression nipple 3. When current flows through the induction coil, an eddy current is induced in a region of its material which is determined by the geometry of the induction coil and the geometrical association thereof with respect to the compression nipple 3, and that eddy current results in locally limited and precisely controllable heating so that it is possible accurately to determine not only the geometry of the material zone 13, that is to say the surface dimensions and the depth thereof, but also the heating temperature and possibly, with suitable control of the flow of current, also the cooling effect, after the arrangement has been heated to the desired temperature.

The particular advantage of inductive soft annealing which is used herein is therefore more particularly that a quite definite and predeterminable material zone 13 is subjected to annealing in the desired fashion in a precisely localised manner.

It will be appreciated that the above-described injection line has been set forth solely by way of example of the present invention and that various modifications and alterations may be made therein without thereby departing from the scope of the invention.

What is claimed is:

1. A fuel injection line for an internal combustion engine including at, at least one of the line's ends, a compression nipple formed thereon by upsetting, the nipple comprising a forward sealing taper portion (4) having a sealing surface (5) which with plastic deformation thereof serves for sealing against a hollow taper surface (6) of matching taper angle of a co-operating portion (7) which is harder than said sealing surface (5), the nipple also comprising a rearward bearing surface (8) for bearing against a hollow taper surface (9) of a cap nut (10), the rearward bearing surface (8) being in the form of a spherical segment which blends into the outside periphery of an adjoining pipe portion by way of a rounded portion, wherein the injection line is formed from a pipe of steel of cold-worked hardness, the compression nipple is formed by upsetting on said pipe and the compression nipple is subjected to inductive soft annealing only in a material zone (13) defined by a contact surface at which said forward sealing taper portion (4) is to be in contact against said hollow taper surface (6) of said co-operating portion.

2. An injection line as set forth in claim 1 wherein the thickness of the soft-annealed material zone is about 0.4 to 0.6 mm.

3. An injection line as set forth in claim 2 wherein said thickness is about 0.5 mm.

4. An injection line as set forth in claim 1, wherein said annealed material zone (13) extends beyond said contact surface, both rearwardly towards a base region where said forward sealing taper portion (4) connects to said rearward being surface and also forwardly into an end surface (14) located at the free end of said forward sealing taper portion.

5. An injection line as set forth in claim 1 wherein the injection line is formed from a pipe of low-carbon non-alloyed steel of cold-worked hardness.

6. An injection line as set forth in claim 1 wherein the injection line is formed from a pipe of high-carbon steel of cold-worked hardness.

7. An injection line as set forth in claim 1 wherein the injection line is formed from a pipe of alloyed steel of cold-worked hardness.

8. A process for the production of an injection line for an internal combustion engine, using a pipe of steel of cold-worked hardness, wherein a compression nipple is formed by upsetting on said pipe, the compression nipple including a sealing taper portion providing a taper surface adapted to co-operate with a hollow taper surface of a co-operating portion to which the nipple is to be fixed, and then the compression nipple formed by upsetting is subjected to soft annealing only in a material zone defined by a contact surface where the sealing taper portion is to be in contact with the hollow taper surface of said co-operating portion, by locally restricted inductive heating.

9. A process as set forth in claim 8 wherein said operation of annealing of said material zone is effected in the form of recrystallisation annealing at a temperature of about 700° C.

10. A process set forth in claim 8 wherein the compression nipple is formed on the pipe by upsetting in a closed extrusion tool.

* * * * *